UNITED STATES PATENT OFFICE.

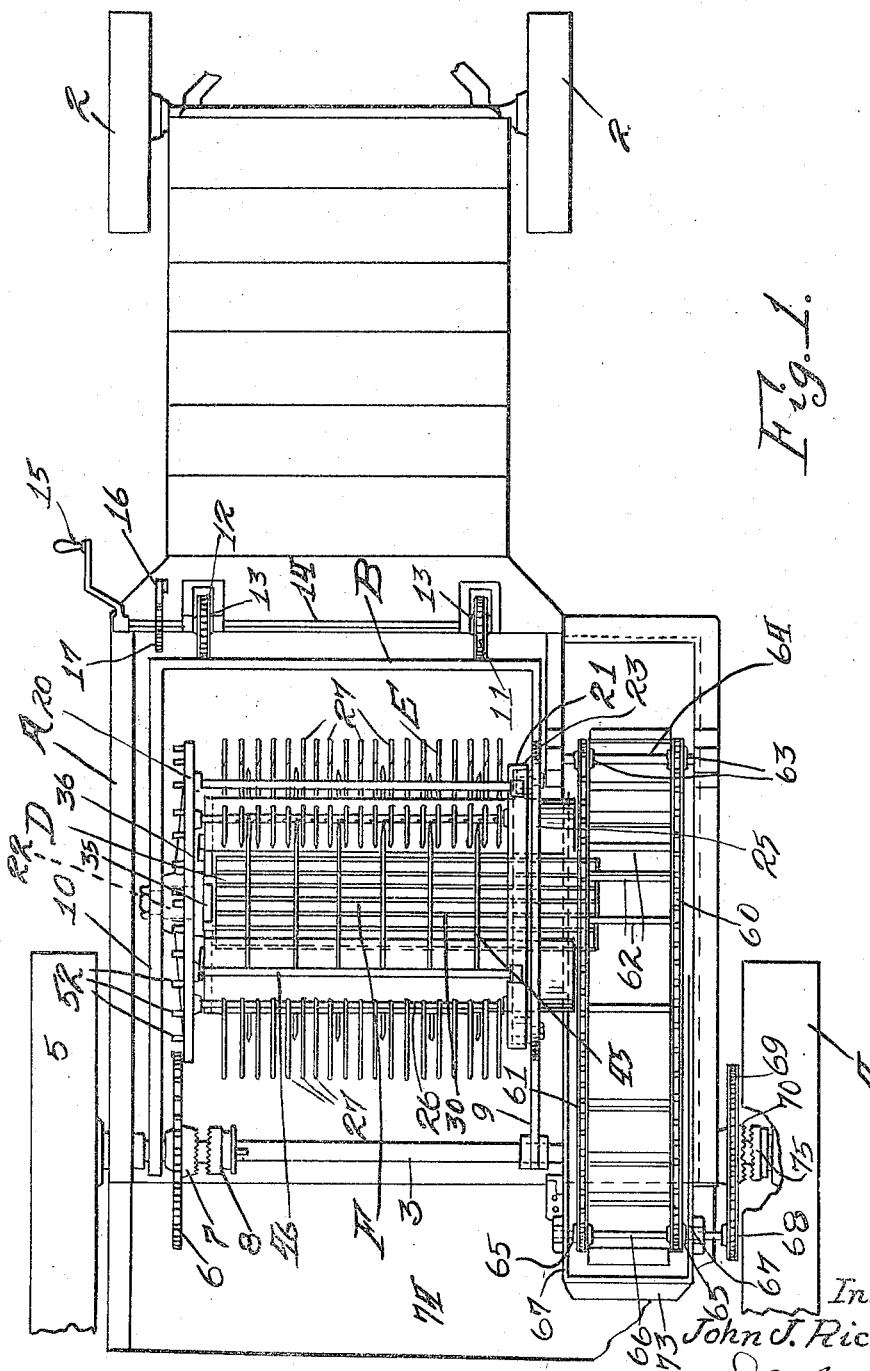

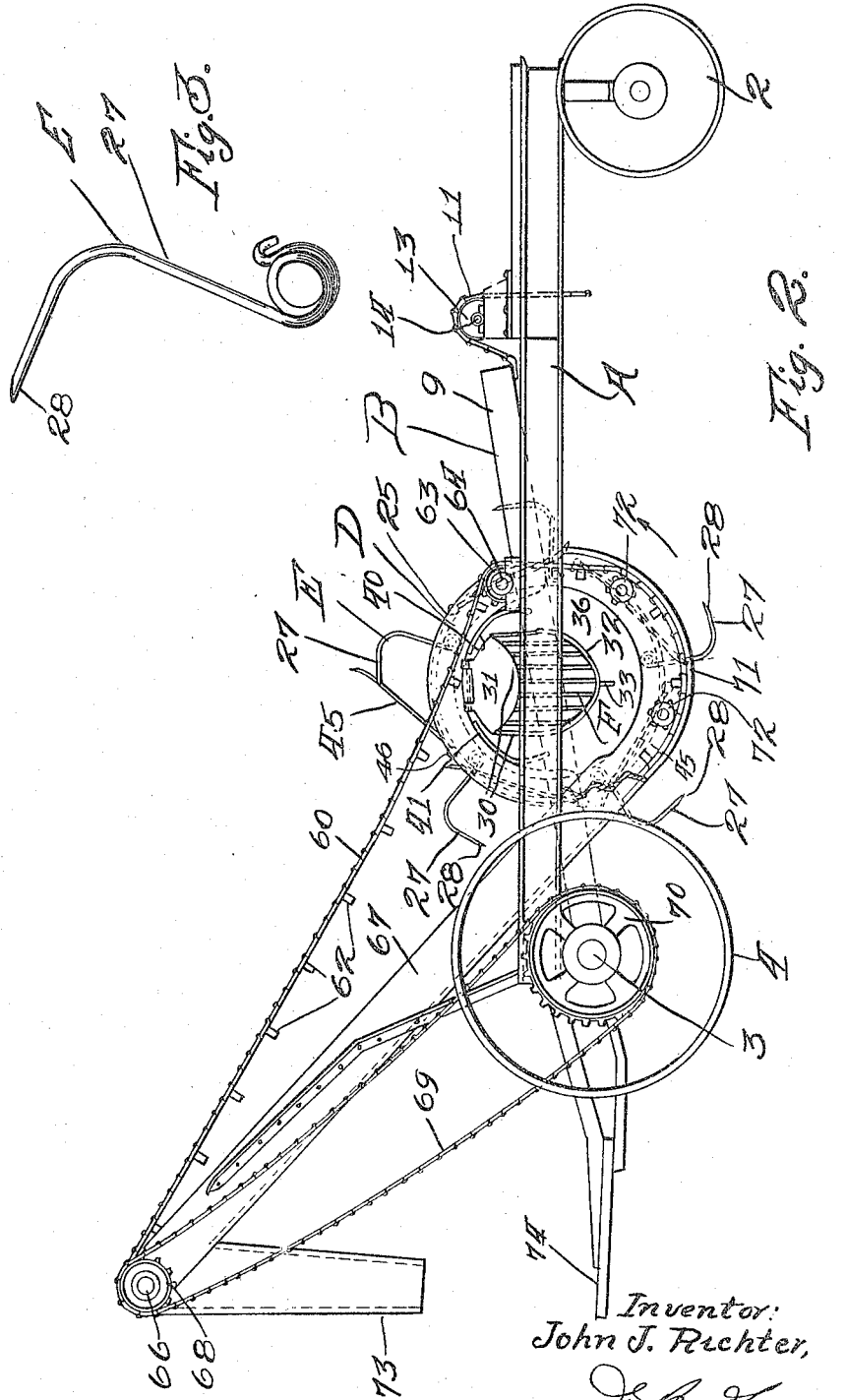

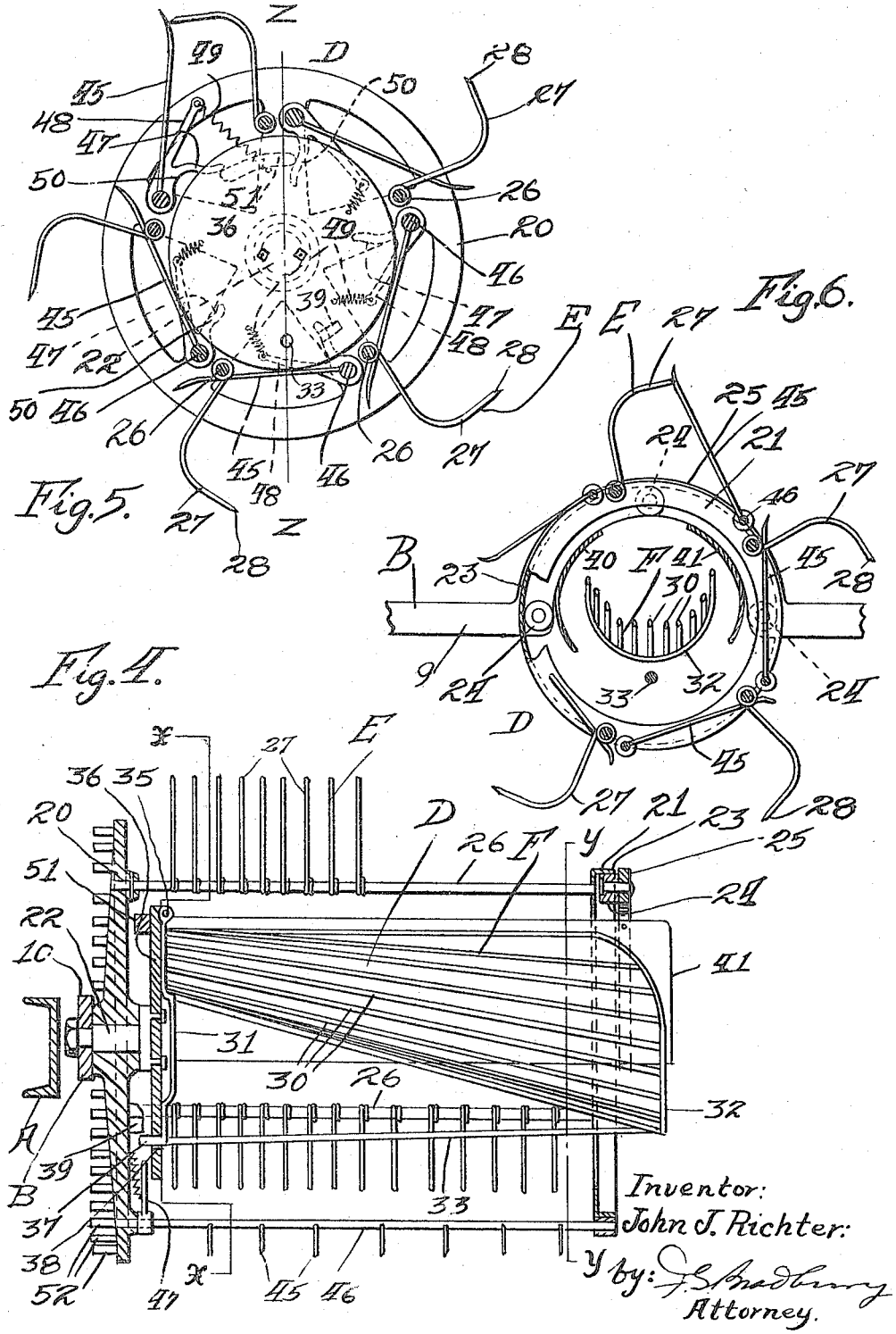

JOHN J. RICHTER, OF THIEF RIVER FALLS, MINNESOTA.

POTATO-PICKER.

1,193,189.  Specification of Letters Patent.  Patented Aug. 1, 1916.

Application filed May 7, 1915. Serial No. 26,672.

*To all whom it may concern:*

Be it known that I, JOHN J. RICHTER, a citizen of the United States, residing at Thief River Falls, in the county of Pennington and State of Minnesota, have invented a new and useful Improvement in Potato-Pickers, of which the following is a specification.

The object of this invention is to provide a simple, convenient and effective potato picker, which will gather the potatoes off of the surface of the ground, after they have been dug and allowed to cure, and which will separate the vines and dirt from the potatoes and deposit the clean potatoes in bags or any other receptacles desired.

More particularly this invention relates to that class of pickers, in which the parts are mounted upon a vehicle separate from the potato digger or plow.

While particularly adapted for picking potatoes, this machine is also applicable for picking other kinds of products and I desire to have it understood that the invention is not limited by the term "potato" as employed herein.

To these ends my invention, comprises the features of construction and combinations of parts hereinafter more particularly described and claimed.

In the accompanying drawings forming part of this specification, Figure 1 is a plan of my invention; Fig. 2 is a side elevation; Fig. 3 is a perspective of one of the rake teeth; Fig. 4 is a longitudinal section of a detail, the line of section being indicated by Z—Z in Fig. 5; Fig. 5 is a section taken on the line X—X of Fig. 4, and Fig. 6 is a section taken on the line Y—Y of Fig. 4.

My invention comprises an assemblage of coöperating parts for picking potatoes off of the ground and separating them from any soil adhering to their surfaces and from any vines or foul growth and depositing the clean potatoes at a point convenient for placing them in bags or receptacles, said parts being mounted upon a vehicle of any kind and any convenient source of power being provided for operating the parts. I have chosen to illustrate these coöperating parts comprising my invention on a vehicle having a main frame A, said frame being supported by the front steering wheels, such as 2, and a rear axle or shaft 3, which in turn is mounted upon the rear carrier wheels 4 and 5. The carrier wheels 4 and 5 are freely journaled on the shaft 3 and connected thereto by pawl and ratchet connections of usual constructions, whereby the vehicle will steer freely and the shaft 3 is revolved when the vehicle advances. Journaled upon the shaft 3 is a drive sprocket 6 carrying a clutch member 7 which co-acts with the companion clutch member 8, which is feathered on the shaft 3, whereby the sprocket 6 can be thrown into and out of operation by manipulating the clutch member 8. The frame A contains an auxiliary frame B in the form of a yoke having side members 9 and 10 journaled by their ends upon the main shaft 3, the body of said yoke being supported by chain belts 11 and 12 secured to the yoke and to sprocket wheels 13, which are mounted upon a winch shaft 14. This winch shaft is journaled on the frame and can be turned by a crank arm 15 or other suitable means, a pawl and ratchet 16 and 17 being provided for holding the shaft against turning with the body of the yoke frame adjusted in elevation.

Mounted upon the yoke frame is a cylinder D in the form of a skeleton frame journaled to revolve about its axis on said frame, the axis of said cylinder lying substantially parallel with the axis of the main shaft 3 across the vehicle. From the periphery of said cylinder extend any number of rakes E desired which as the cylinder revolves in the direction of the arrows indicated in Fig. 2 are adapted to gather the potatoes off of the ground after they have been dug and cured and deposit them into the cylinder. The cylinder is composed of two circular end members 20 and 21, the member 20 being in the form of a crown toothed master wheel journaled on a stub shaft 22, which is bolted to the side 10 of the auxiliary frame and the end member 21 being in the form of a ring having an outwardly extending circular flange 23 which is journaled upon antifriction rollers 24. These antifriction rollers are journaled freely on a segment 25, which is formed integral with the side 9 of the auxiliary frame. The two end members 20 and 21 are connected rigidly by a plurality of arms 26, which are spaced apart and arranged longitudinally about the axis of the cylinder. Each of the arms 26 carries a plurality of rake teeth 27, which are secured by coiling and fastening their inner ends to the arm which supports them, whereby the arms are adapted to spring sufficiently to prevent breaking, should their points strike an obstruction when revolving with the cylinder. The ends of the rake teeth 28 are bent downwardly to most effectively gather the potatoes off of the ground and lift them upwardly as the cylinder revolves, the body portions of the teeth acting as slides to transfer the potatoes into the cylinder as the rake teeth rise above the ground. By this construction the cylinder is made of skeleton form, providing an open side or top, which admits the potatoes into the cylinder.

Placed within the cylinder longitudinally thereof, is a shaker trough F of skeleton form, composed of a plurality of arms 30 spaced apart sufficiently to allow any soil separated from the potatoes to sift through and fall upon the ground. The arms 30 are secured by their inner ends to a plate member 31 and by their outer ends to a marginal member 32, said arms being inclined downwardly and outwardly through one end of the cylinder and through the space formed by the segment 25. The outer end of the trough is supported by the brace 33 which is secured to the lower end of the plate member 31. In this manner the entire shaker trough is built upon the plate member 31 and projects with its lower end laterally therefrom. The upper end of the plate member 31 is hinged at 35 on a disk support 36, which is secured to the stationary stub shaft 22, while the lower end is free to swing, it being offset and formed into a guide 37, which slides outwardly and inwardly in a guide opening 38 in the disk support 36. The master wheel 20 is formed with a cam shoulder 39, the cam surface of which slides against the guide 37 and imparts a shaking motion to the trough as the master wheel revolves, thereby loosening any soil from the potatoes and causing it to separate and drop through the trough on to the ground. Placed above the trough is a pair of longitudinal guards 40 and 41, which are positioned apart to form an opening vertically over the shaker trough through which the potatoes drop into the shaker trough from the rakes. These guards also prevent vines and foul growth entering the shaker trough and are secured to the end member 36 and to the segment 25 rigidly.

In order to strip any vines or foul growth from the rake teeth which are picked up by the rakes as the cylinder revolves, I provide a set of strippers for each set of rake teeth, each set of strippers consisting of a plurality of arms 45 mounted rigidly upon a shaft 46, which is journaled by its ends in the end members 20 and 21, the axis of said shaft 46 lying parallel with the axis of the adjacent arm 26 carrying rake teeth. The free ends of the stripping teeth 45 project into the spaces between the rake teeth, and as the cylinder revolves, during the lifting movement of the rake teeth, the stripping teeth swing upwardly, lifting any vines or foul growth from the rake and depositing the same to the rear of the cylinder in position to fall upon the ground as the cylinder revolves. Each of the stripper shafts 46 carries a bell crank lever 47 secured rigidly thereto, the arm 48 being secured to a coil spring 49. This coil spring is attached under tension to the master wheel 20 and returns the stripping teeth into normal position, after each operation, the stripping teeth having to work against the tension of the spring 49 each time said teeth are swung outwardly to strip the vines and foul growth from the rake teeth. The other arm 50 of the bell crank lever is curved to slide freely against a cam shoulder 51 which is mounted upon the disk plate 36 in the path of the arms 50, said arms being offset from the members 48, so that they alone strike upon the cam 51 to tilt the stripping teeth outwardly as the cylinder revolves. In this manner during each revolution of the cylinder, each set of stripping teeth is tilted forwardly to perform its function immediately after the rake teeth have engaged and lifted the potatoes off of the ground and previous to the period when the rake teeth are in slanting position to slide the potatoes down into the shaker trough.

The master wheel 20 has its teeth 52 in mesh with the teeth of the drive sprocket 6, and by this means motion is communicated from the drive shaft to the cylinder.

Arranged along one side of the vehicle and in position to receive the potatoes as they fall from the lower end of the shaker trough is an elevator. This elevator is in the form of two endless chain belts 60 and 61, having flights 62 secured to said belts and projecting inwardly. The lower end of the belts passes over sprocket wheels 63 mounted upon a shaft 64, which is journaled in the main frame A of the vehicle, while the upper end of said belts passes over sprocket wheels 65, which are mounted upon a shaft 66, said shaft being journaled in side members 67 secured to the main frame and driven by a sprocket 68, on the shaft, a chain belt 69 passing over said sprocket and another sprocket 70 mounted upon the carrier wheel 4 and over which said chain belt also passes. By this means the elevator is operated. The elevator belt runs with its lower side in an elevator trough formed by the floor 71, and the sides 67, which are secured to said floor and to the main frame of the structure. The lower end of the elevator trough has a long curve in its floor, so that the lower portion of the belt forming a boot has a long curved sweep into the lap of which the potatoes drop and are carried upwardly by the flights without crushing or becoming mutilated. Idle guide pinions 72 journaled freely in the sides of the elevator trough and meshing with the links of the chain belts 60 hold the lower side of the chain belt down in the boot portion of the elevator trough in position to most effectively guide the belt in making the long sweep referred to.

In operation the arrangement of the various parts of the invention is so that the potatoes are gathered off of the ground by the rakes and lifted and slid into the shaker trough which is disposed longitudinally within and of the cylinder. The potatoes sliding down the shaker trough by gravity and by the assistance of the shaking movement which is imparted to the trough drop into the boot of the elevator trough and are thence elevated. At the upper end of the elevator is a depending spout 73, into which the potatoes pass and drop downwardly into a sack or other receptacle placed below the spout on the platform 74 of the machine.

As the rakes are revolved by the cylinder, the strippers remove the vines and foul growth in advance of the potatoes sliding down the rakes into the shaker trough and the vines and foul growth so removed are thrown backwardly and caused to drop on the ground free from the potatoes. As the potatoes are sliding downwardly in the shaker trough any soil or undersized potatoes drop through the spaces between the bars of the trough on to the ground, leaving the potatoes which fall into the elevator trough clean, sorted and free from vines and foul growth. By raising the auxiliary frame B, the picking apparatus can be moved into a position in which the rakes will not pick up any potatoes off of the ground and by throwing the member 8 of the clutch out of engagement with the member 7, the driving mechanism which imparts motion to the cylinder and shaker trough is disconnected, leaving the machine free to travel without operating the picking apparatus. The sprocket 70 can be connected to the drive wheel 4 by an intermediary clutch such as 75, said clutch permitting disengagement from the driving member when desired, whereby the elevator can also be disconnected and thrown out of operation when desired. It is obvious that any power may be employed for propelling the vehicle within the scope of my invention.

In accordance with the patent statutes, I have described the principles of operation of my invention, together with the apparatus which I now consider to represent the best embodiment thereof, but I desire to have it understood that the construction shown is only illustrative, and that the invention can be carried out by other means and applied to uses other than those above set forth within the scope of the following claims.

Having described my invention what I claim as new and desire to protect by Letters Patent is:

1. A machine of the class described comprising, in combination, a vehicle, an open ended cylinder provided with rake teeth revolubly journaled on said vehicle, a trough disposed within said cylinder and designed to deposit objects delivered thereinto by said rake teeth through an end of said cylinder, and means coöperating with said rake teeth to prevent the entrance of vines and foul growth into said trough.

2. A machine of the class set forth, comprising, in combination, a vehicle, a cylinder in the form of a skeleton frame journaled to revolve about its axis on said vehicle and having an open side, an open end and a plurality of rakes projecting from its periphery adapted to gather potatoes off of the ground and deposit them within said cylinder, means associated with said cylinder for stripping vines and foul growth off of said rakes before the potatoes pass from the rakes into the cylinder, a trough arranged within said cylinder to receive the potatoes from said rakes and slide them out of the cylinder, a carrier arranged to receive the potatoes from said trough and transfer them to a point distanced from the cylinder and means for revolving said cylinder.

3. A machine of the class described comprising, in combination, a vehicle, an open ended cylinder provided with rake teeth revolubly journaled on said vehicle, a trough having a filling opening disposed for vibratory motion within said cylinder and designed to deposit objects delivered thereinto by said rake teeth through an end of said cylinder, and guard members secured adjacent the filling opening of said trough for preventing the entrance of vines and foul growth into the trough.

4. A machine of the class described comprising, in combination, a vehicle, an open ended cylinder provided with rake teeth revolubly journaled on said vehicle, a trough disposed within said cylinder and designed to deposit objects delivered thereinto by said rake teeth through an end of said cylinder, said trough having a filling opening provided with means to prevent the entrance of vines and foul growth into the trough, and means coöperating with said rake teeth to deposit such vines and foul growth at a point remote from the filling opening of said trough.

5. A machine of the class set forth, comprising, in combination, a vehicle having a main frame and an auxiliary frame movably mounted on said main frame to rise and lower, a cylinder journaled upon said auxiliary frame, said cylinder being of open work construction, a shaker trough disposed longitudinally within said cylinder and inclining downwardly and out of the cylinder, a plurality of rakes carried by said cylinder, adapted as the cylinder revolves to gather the potatoes off of the ground and lift and deposit them into said shaker trough, means for stripping vines and foul growth from said rakes before the potatoes slide into said trough, means for revolving said cylinder and operating said strippers and means for raising and lowering said auxiliary frame to move the rakes into and out of position to gather the potatoes on the ground.

6. A machine of the class set forth, comprising, in combination, a vehicle having a main frame and an auxiliary frame hinged upon said main frame to swing up and down, means for holding the free end of said auxiliary frame either in raised or lowered position, a cylinder journaled upon said auxiliary frame to revolve about its longitudinal axis, a plurality of rakes projecting from the periphery of said cylinder, a plurality of strippers co-acting with said rakes to remove any vines and foul growth from the teeth of the rakes, a shaker trough disposed longitudinally within said cylinder inclining downwardly and projecting outwardly from an end of the cylinder to slide potatoes outwardly therefrom, means for shaking said trough to remove any soil from the potatoes in the trough, said rakes being adapted to gather the potatoes on the ground and lift and slide them into said trough, means for operating said strippers to remove vines and foul growth from said rakes immediately after the potatoes are gathered by the rakes and before the potatoes slide into said trough, means for revolving said cylinder and an elevator below the lower end of said trough adapted to convey the potatoes to a point distanced from said cylinder convenient to be placed in receptacles.

In testimony whereof I have signed my name to this specification in the presence of two subscribing witnesses.

JOHN J. RICHTER.

Witnesses:
STELLA L. WASCHENBERGER,
F. G. BRADBURY.

Copies of this patent may be obtained for five cents each, by addressing the "Commissioner of Patents, Washington, D. C."